United States Patent Office 3,084,094
Patented Apr. 2, 1963

3,084,094
NEMATOCIDAL HALOALKYL ACID ESTER
Samuel I. Gertler, Washington, D.C.,
dedicated to the public
No Drawing. Filed Oct. 4, 1955, Ser. No. 538,537
8 Claims. (Cl. 167—22)
(Granted under Title 35, U.S. Code (1952), sec. 266)

A non-exclusive, irrevocable, royalty-free license in the invention described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to nematocides, their preparation and their method of application.

Nematodes belong to a class of unsegmented worms of the phylum Nathelminthes. Certain species of this class of worm, members of the subfamily Pratylenchinae are known to effect a number of subtropical and tropical plants. They have been found in the roots of citrus and a wide variety of other plants including many ornamentals. These root inhibiting nematodes are believed to be responsible for "spreading decline" in citrus and cause millions of dollars of annual damage in the United States.

It has been found that esters of haloalkyl acids are effective agents for treating the roots of plants for the control of harmful nematodes contained therein.

These esters can be represented by the general formula

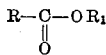

wherein R is selected from a group consisting of

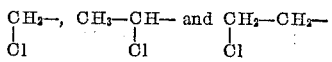

and wherein $R_1$ is selected from a group comprising an alkyl group, a halogen-substituted alkyl group, a cycloaliphatic group, an alkyl-substituted cycloaliphatic group, an aralkyl group and an aroxyalkyl group.

The compounds were prepared by the esterification of the halogenated acid with the required alcohol by methods known in the art, using a suitable catalyst, such as sulphuric acid or toluene-sulfonic acid.

The following examples illustrate the effectiveness of the compositions made according to this invention. Nematocide test compositions according to this invention contain from a minimum of 0.001 percent to 1.0 percent of effective compound on a volume-volume basis in an aqueous medium having dissolved therein from 2 to 10 times as much of a wetting agent, such as Triton X-100 or Tergitol 4, by volume as the toxicant. Specific test organisms were the golden nematode (*Heterodera rostochiensis*) and the meadow nematode (*Pratylenchus* sp.).

EXAMPLE 1

*Nematocide Tests Using* Heterodera Rostochiensis

Nematocidal emulsion compositions were prepared by treating an aqueous mixture containing from 0.001 to 1.0 percent by volume of the nematocide with 0.005 to 5.0 percent of Triton X-100. A cyst mixture containing 100-300 nematode cysts per test was dipped into the haloalkyl ester composition for periods from 1 to 30 minutes. After removing from the toxicant the cysts were set aside and examined after a period of weeks and the percentage of nonviable nematodes determined. The following table shows the results on a number of representative compounds comprising this group of haloalkyl esters.

TABLE I. NEMATOCIDAL ACTION OF HALOALKYL ESTERS AGAINST *Heterodera Rostochiensis*

| Name of Toxic Compound | Concentration, percent by volume | No. of weeks before examining cysts | Percent Mortality of Nematodes |
|---|---|---|---|
| Butyl chloroacetate | 1.0 | 75 | 100 |
| Do | 0.01 | 75 | 100 |
| Do | 0.001 | 75 | 100 |
| 2-Isopropylcyclohexyl chloroacetate | 1.0 | 88 | 100 |
| Do | 0.001 | 88 | 100 |
| 2-sec-Butylcyclohexyl chloroacetate | 1.0 | 17 | 100 |
| 2-Chloroisopropyl 2-chloropropionate | 1.0 | 75 | 100 |
| p-Methylcyclohexyl 2-chloropropionate | 1.0 | 78 | 100 |
| 2-Chloroethyl 3-chloropropionate | 1.0 | 75 | 100 |
| Do | 0.01 | 75 | 100 |
| Do | 0.001 | 75 | 100 |
| 2-Methylpentyl 3-chloropropionate | 1.0 | 17 | 99.5 |
| 2-Octyl 3-chloropropionate | 1.0 | 17 | 99.5 |
| 2-Ethylhexyl 3-chloropropionate | 1.0 | 17 | 100 |
| 2-Butyloctyl 3-chloropropionate | 1.0 | 75 | 100 |
| Benzyl 3-chloropropionate | 1.0 | 76 | 100 |
| Do | 0.01 | 76 | 100 |
| Do | 0.001 | 76 | 100 |
| Cyclohexyl 3-chloropropionate | 1.0 | 75 | 100 |
| Do | 0.01 | 75 | 100 |
| 4-Isopropylcyclohexyl 3-chloropropionate | 1.0 | 25 | 100 |
| 2-Phenoxyethyl 3-chloropropionate | 1.0 | 75 | 100 |
| Do | 0.01 | 75 | 100 |
| Do | 0.001 | 75 | 100 |

EXAMPLE II

*Nematocide Tests Using Pratylenchus sp.*

For these tests the nematocidal emulsions were prepared as in Example I using concentrations of from 0.1 percent to 1.0 percent by volume. Ornamental plants such as azalea, philodendron, hibiscus, Chinese evergreen, midget palm and the like, the roots of which were infested with meadow nematode (*Pratylenchus* sp.) were used as a host. The roots of these plants were washed free of adherent soil and the excess water removed prior to treatment. The plants were then arranged in the treating vessels so that only the roots were immersed in the nematocidal medium for one hour. Splashing is avoided on the rest of the plant to prevent any possibility of injury to foliage. The plants are then removed, replanted in sterile soil and examined at daily intervals. The roots were chopped in a Waring Blendor, the nematodes collected by sieving and the effectiveness of the control thus determined.

TABLE II.—NEMATOCIDAL ACTION OF HALOALKYL ESTERS AGAINST PRATYLENCHUS SP.

| Name of Toxic Compound | Concentration, percent by volume | Minimum, percent control |
|---|---|---|
| Butyl chloroacetate | 0.01 | 98 |
| 2-Isopropylcyclohexyl chloroacetate | 1.0 | 90-95 |
| 2-sec-Butylcyclohexyl chloroacetate | 1.0 | 90-95 |
| 2-Chloroisopropyl 2-chloropropionate | 1.0 | 90-95 |
| p-Methylcyclohexyl 2-chloropropionate | 1.0 | 90-95 |
| 2-Chloroethyl 3-chloropropionate | 0.01 | 98 |
| 2-Methylpentyl 3-chloropropionate | 1.0 | 90-95 |
| 2-Octyl 3-chloropropionate | 1.0 | 90-95 |
| 2-Ethylhexyl 3-chloropropionate | 1.0 | 90-95 |
| 2-Butyloctyl 3-chloropropionate | 1.0 | 90-95 |
| Benzyl 3-chloropropionate | 1.0 | 90-95 |
| Cyclohexyl 3-chloropropionate | 1.0 | 90-95 |
| 4-Isopropylcyclohexyl 3-chloropropionate | 1.0 | 90-95 |
| 2-Phenoxyethyl 3-chloropropionate | 0.1 | 98 |

These nematocidal compositions may be applied to growing plants in the field by treating the soil around

I claim:

1. A method of preventing damage to plants by nematodes which comprises contacting the nematodes with a haloalkyl ester of the formula $$R-\underset{\underset{O}{\|}}{C}-OR_1$$

where R is a radical selected from the group consisting of $ClCH_2-$, $$\underset{\underset{Cl}{|}}{CH_3CH-}$$

and $ClCH_2-CH_2-$ and where $R_1$ is a radical selected from the group consisting of alkyl, halogen-substituted alkyl, cyclohexyl, alkyl-substituted cyclohexyl, benzyl, and phenoxyethyl, the hydrocarbon moiety of the radical $R_1$ containing from 2 to 12 carbon atoms.

2. The method of claim 1 wherein the haloalkyl ester is butyl chloroacetate.

3. The method of claim 1 wherein the haloalkyl ester is 2-chloroethyl 3-chloropropionate.

4. The method of claim 1 wherein the haloalkyl ester is 2-phenoxyethyl 3-chloropropionate.

5. The method of claim 1 wherein the haloalkyl ester is 2-isopropylcyclohexyl chloroacetate.

6. The method of claim 1 wherein the haloalkyl ester is benzyl 3-chloropropionate.

7. A method of preventing damage to plants by nematodes which comprises applying to nematode-infested soil a haloalkyl ester of the formula $$R-\underset{\underset{O}{\|}}{C}-OR_1$$

where R is a radical selected from the group consisting of $ClCH_2-$, $$\underset{\underset{Cl}{|}}{CH_3CH-}$$

and $ClCH_2-CH_2-$ and where $R_1$ is a radical selected from the group consisting of alkyl, halogen-substituted alkyl, cyclohexyl, alkyl-substituted cyclohexyl, benzyl, and phenoxyethyl, the hydrocarbon moiety of the radical $R_1$ containing from 2 to 12 carbon atoms.

8. A method of preventing damage to plants by nematodes which comprises applying to nematode-infested roots of the plants a haloalkyl ester of the formula $$R-\underset{\underset{O}{\|}}{C}-OR_1$$

where R is a radical selected from the group consisting of $ClCH_2-$, $$\underset{\underset{Cl}{|}}{CH_3CH-}$$

and $ClCH_2-CH_2-$ and where $R_1$ is a radical selected from the group consisting of alkyl, halogen-substituted alkyl, cyclohexyl, alkyl-substituted cyclohexyl, benzyl, and phenoxyethyl, the hydrocarbon moiety of the radical $R_1$ containing from 2 to 12 carbon atoms.

References Cited in the file of this patent

UNITED STATES PATENTS

| | | |
|---|---|---|
| 1,851,040 | Fikentscher et al. | Mar. 29, 1932 |
| 1,982,909 | Flint | Dec. 4, 1934 |
| 2,217,905 | Hoffman | Oct. 15, 1940 |
| 2,282,732 | Lean | May 12, 1942 |
| 2,377,446 | Payne | June 5, 1945 |
| 2,415,251 | Leavitt | Feb. 4, 1947 |
| 2,422,728 | Gresham et al. | June 24, 1947 |
| 2,430,326 | Cheney | Nov. 4, 1947 |
| 2,448,265 | Kagy | Aug. 31, 1948 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,770,638 | Giolito | Nov. 13, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |
| 2,802,831 | Wheeler | Aug. 13, 1957 |
| 2,809,983 | Heininger | Oct. 15, 1957 |

OTHER REFERENCES

Hiemenz et al.: J. Am. Chem. Soc. 71 (1949), pp. 1137–8.

Roark et al.: Ind. Eng. Chem. 20 (1928), pp. 512–3.

Webster's New International Dictionary of the English Language, 2nd Ed., 1940, G. & C. Merriman & Co., p. 818.

King: U.S. Dept. Agr. Handbook No. 69, May 1954, pp. 29, 292.